(12) United States Patent
Hong et al.

(10) Patent No.: US 7,355,592 B2
(45) Date of Patent: Apr. 8, 2008

(54) DIGITAL RESISTIVE TYPE TOUCH PANEL AND FABRICATION METHOD THEREOF

(75) Inventors: Hee Jung Hong, Seoul (KR); Hee Jeong Park, Bucheon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 527 days.

(21) Appl. No.: 10/680,202

(22) Filed: Oct. 8, 2003

(65) Prior Publication Data
US 2005/0190161 A1    Sep. 1, 2005

(30) Foreign Application Priority Data
Dec. 24, 2002    (KR) .................. 10-2002-0083300

(51) Int. Cl.
*G09G 5/00* (2006.01)
(52) U.S. Cl. .................. 345/173; 345/174; 178/18.06
(58) Field of Classification Search ................ 345/173, 345/174; 178/180.3, 18.06
See application file for complete search history.

(56) References Cited

U.S. PATENT DOCUMENTS

| | | | |
|---|---|---|---|
| 4,636,582 A * | 1/1987 | Moriwaki et al. | 178/18.08 |
| 6,483,498 B1 * | 11/2002 | Colgan et al. | 345/173 |
| 6,587,097 B1 * | 7/2003 | Aufderheide et al. | 345/173 |
| 2002/0149572 A1 * | 10/2002 | Schulz et al. | 345/174 |
| 2003/0052867 A1 * | 3/2003 | Shigetaka et al. | 345/173 |
| 2003/0067449 A1 * | 4/2003 | Yoshikawa et al. | 345/173 |
| 2004/0017363 A1 * | 1/2004 | Nakanishi et al. | 345/173 |

FOREIGN PATENT DOCUMENTS

| | | |
|---|---|---|
| JP | 2002-082772 | 3/2002 |
| KR | 10-2001-0003503 | 1/2001 |

* cited by examiner

*Primary Examiner*—Regina Liang
(74) *Attorney, Agent, or Firm*—McKenna, Long & Aldridge LLP

(57) ABSTRACT

A display device integrated with a touch panel is disclosed, which can use various types of input devices. Thus, in addition to conductive devices, a gloved hand or a non-conductive stylus pen can be used as an input. The touch panel includes a supporting substrate; a first transparent conductive layer having a first electrode for applying a voltage to the supporting substrate; a second transparent conductive layer having a second electrode and facing the first transparent conductive layer; an adhesive for attaching the first and second transparent conductive layers to each other; and a passivation film on an outer surface of the second transparent conductive layer.

32 Claims, 6 Drawing Sheets

DIGITAL RESISTIVE TYPE TOUCH PANEL AND FABRICATION METHOD THEREOF

This application claims the benefit of the Korean Application No. P2002-83300 filed on Dec. 24, 2002, which is hereby incorporated by reference for all purposes as if fully set forth herein.

BACKGROUND OF THE INVENTION

1. Field of the Invention

The present invention relates to a display device integrated with a touch panel, and more particularly, to a liquid crystal display device integrated with a touch panel capable of using various input devices, including conductive and nonconductive types, and its fabrication method.

2. Discussion of the Related Art

For personal information devices, such as personal computers and mobile transmission devices, a variety of input devices, such as a keyboard, a mouse and a digitizer, have been generally used for text and graphic processes. As personal information devices are in demand in various fields, the input devices of the keyboard and the mouse have a limit in coping with the demand as an interface. Thus, it is beneficial to develop an input device that is easier to carry and simpler than those conventional input devices. That is, a user can input information such as letters on the input device with a bare hand while carrying the input device. In recent years, modern input devices have been developed not only to satisfy general input functions, but to have new functions and to provide them with great reliability and endurance using a high technology.

Touch panels are known as an input device that are simple, easy to carry, reliable and capable of inputting letters. The function and detection method of such touch panels are described in detail hereafter. Capable of sensing when a user touches a display surface, touch panels may be classified into resistive type, capacitive type, and electromagnetic (EM) type. For the resistive type touch panels, a metal electrode is formed either on an upper substrate or on a lower substrate, and the location of a touched point is detected by reading a voltage gradient created by a resistance at the touched point in an applied D.C. voltage. The capacitive type touch panels detect the location of a touched point based on a voltage change created when an upper substrate having a conductive layer of an equipotental plane is in contact with a lower substrate. Also, the EM type touch panels detect the location of a touched point by reading an induced LC value when a conductive layer is touched with an electronic stylus pen. Since each type has different characteristics of signal amplification, resolution, and difficulty of design and fabrication, a type is chosen for specific applications, such as optical, electrical, mechanical, resistance to ambient atmosphere and input characteristics as well as endurance and economical efficiency.

Hereinafter, a related art touch panel will be described with reference to the accompanying drawings.

Figure 1:
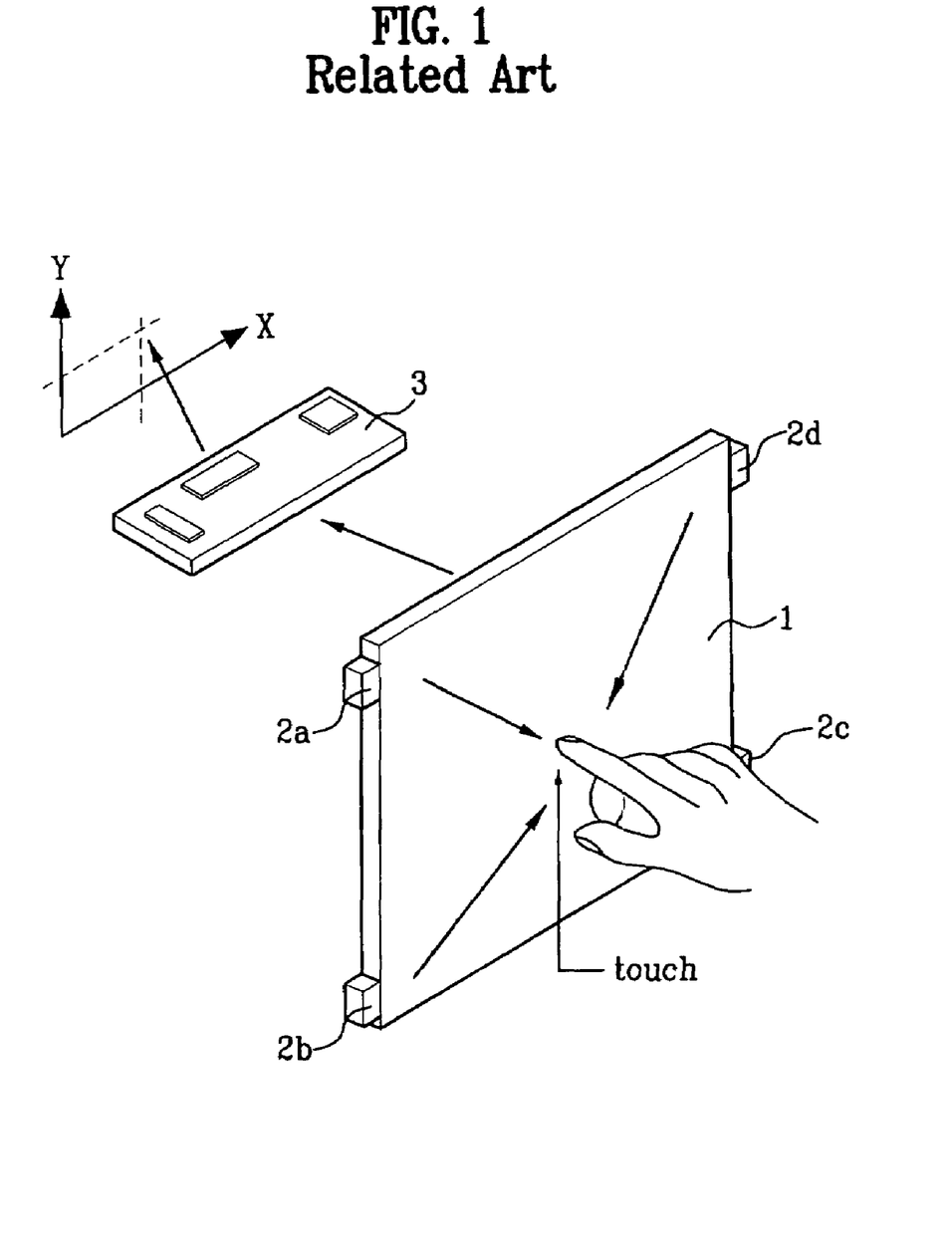
FIG. 1 is a schematic view illustrating a general capacitive type touch panel and an operation principle thereof.

FIG. 1 is a schematic view illustrating a general capacitive type touch panel and its operation principle. As shown in FIG. 1, the general capacitive type touch panel includes metal electrodes 2a, 2b, 2c and 2d at each corner of a curved or plane glass substrate (10 of FIG. 2) coated with a transparent conductive layer 1, for forming an equipotential surface. That is, a voltage is applied to the transparent conductive layer 1 through the metal electrodes 2a, 2b, 2c and 2d for forming an equipotential surface thereon. When a surface of a touch panel is touched, a voltage drop is generated. In the general capacitive type touch panel, the amount of the voltage drop is detected with a controller, thereby detecting the location of the touched point. In this case, the input device of the capacitive type touch panel may be a bare finger or a conductive stylus pen. That is, the input device induces a voltage drop at a touched point when an input surface is touched.

Figure 2:
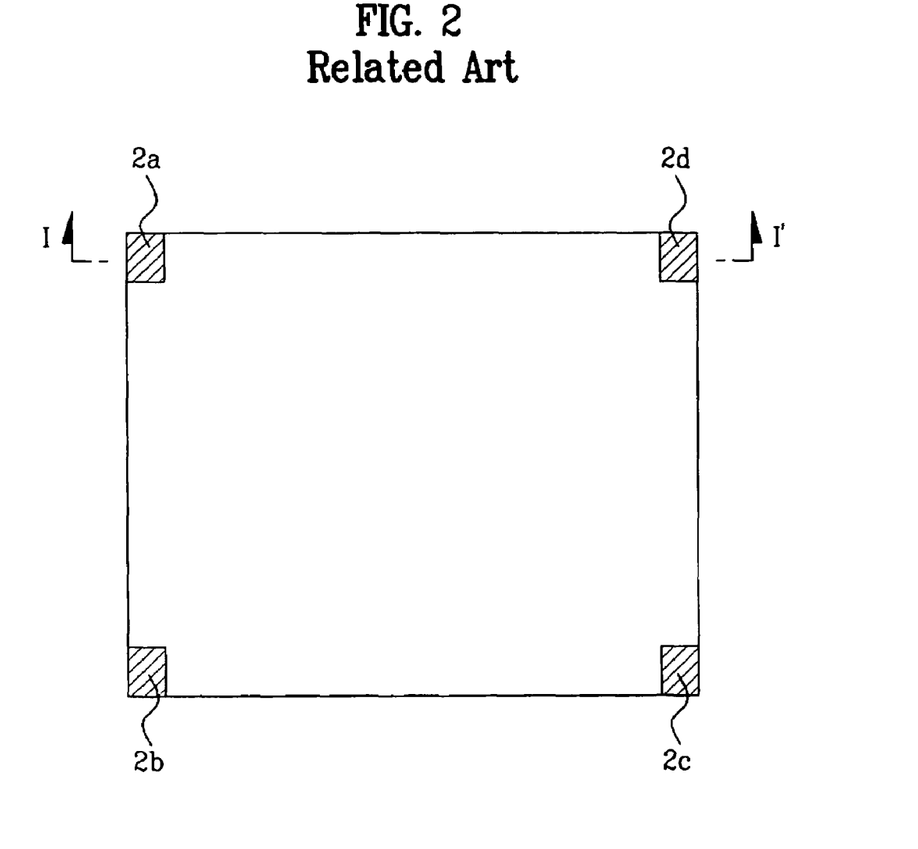
FIG. 2 is a plan view illustrating a general capacitive type touch panel touch panel.

More specifically, the related art capacitive type touch panel will be described with reference to the following plan and cross-sectional views. FIG. 2 is a plan view illustrating a capacitive type touch panel, and FIG. 3 is a cross-sectional view taken along line I-I' of FIG. 2.

Figure 3:
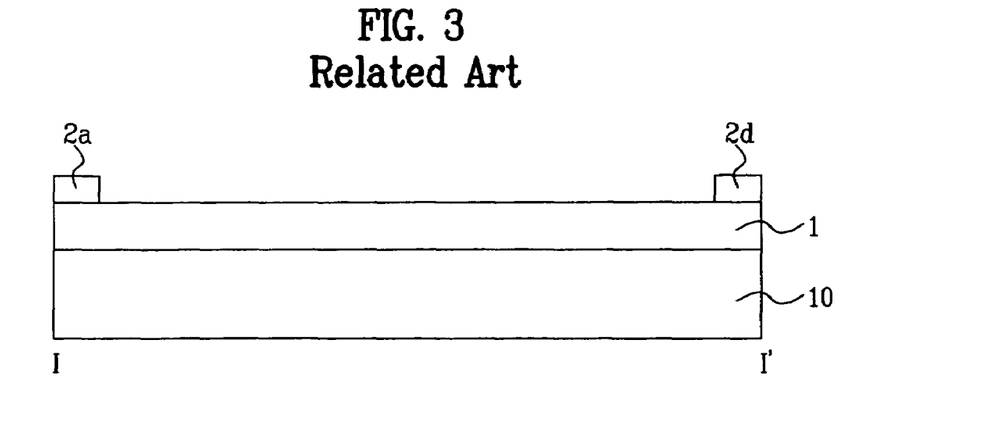
FIG. 3 is a cross-sectional view taken along line I-I' of FIG. 2.

As show in FIGS. 2 and 3, in the capacitive touch panel, the glass substrate is formed as a supporting substrate. Then, the transparent conductive layer is formed on the glass substrate, and the metal electrodes are formed at four corners of the transparent conductive layer for applying a voltage to the transparent conductive layer. Beneficially, the transparent conductive layer 1 is formed of a transparent and conductive material such as Indium-Tin-Oxide (ITO) or Antimony-Tin-Oxide (ATO), and the glass substrate 10 is formed of Soda-Lime Glass.

Then, the metal electrodes 2a, 2b, 2c and 2d are formed at the four corners of the transparent conductive layer 1 by printing a conductive metal having a low resistance, such as Ag. Also, a resistance network is formed around the metal electrodes 2a, 2b, 2c and 2d. The resistance network is formed in a linear pattern for uniformly transmitting control signals to an entire surface of the transparent conductive layer 1. Although not shown, a passivation layer is coated on the transparent conductive layer 1 including the metal electrodes 2a, 2b, 2c and 2d. The passivation layer may be formed of a liquid glass material. However, a heat treatment is performed to the liquid glass material to turn it into a hard coating using a hardening/densifying process.

Figure 4:
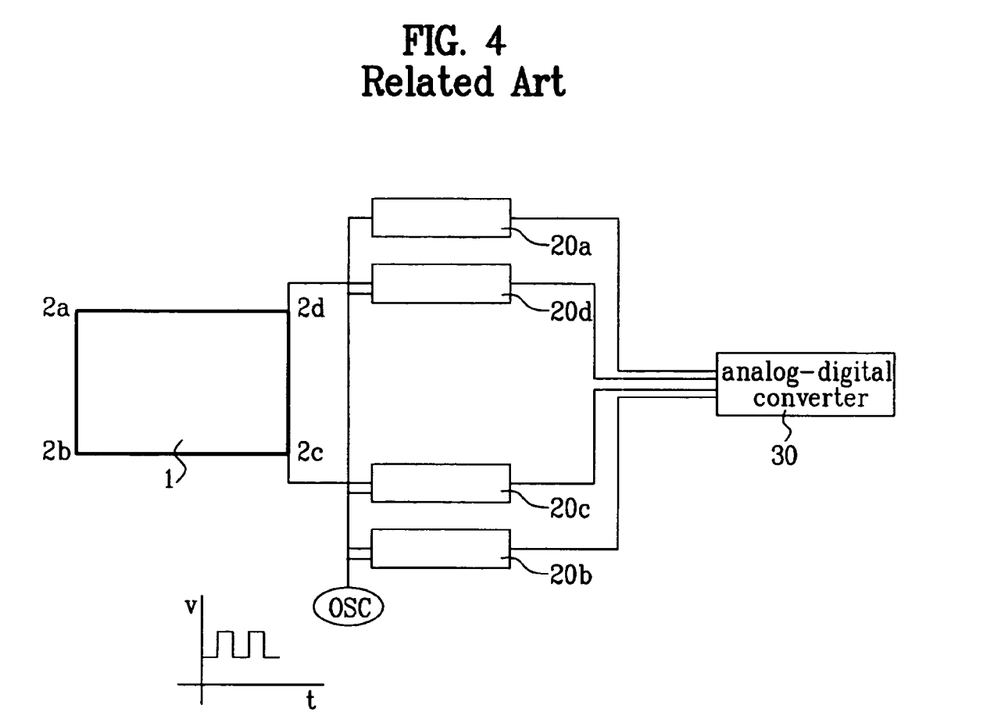
FIG. 4 is a block diagram illustrating an operation principle of a capacitive type touch panel.

FIG. 4 is a block diagram illustrating an operation principle of a general capacitive type touch panel. As shown in FIG. 4, a voltage is applied to the metal electrodes 2a, 2b, 2c and 2d at the four corners of the transparent conductive layer 1 in the general capacitive type touch panel. A high frequency voltage is beneficially transmitted to the entire surface of the touch panel. At this time, if the transparent conductive layer 1 is touched with a finger or a conductive stylus pen, a current change is detected by each of the current sensors 20a, 20b, 20c and 20d. The current sensors 20a, 20b, 20c and 20d as well as an analog-digital converter 30 correspond to the controller (reference numeral 3 of FIG. 1). The controller 3 provides a square wave having a frequency on the order of several kilohertz Hz to the current sensors 20a, 20b, 20c and 20d through an internal oscillator OSC, and the current sensors 20a, 20b, 20c and 20d continuously charge and discharge. Then, the amount of charge is integrated in a digital mode during an integral period (usually 8 msec). In this way, it is possible to determine whether the input surface is touched. If the input surface is touched, the coordinates of the touched point are measured, and then is outputted to a system (not shown) as information. In the general capacitive type touch panel, the input means are restricted to bare fingers or conductive stylus pens. Accordingly, when a gloved hand is used or when a conductive stylus pen is unavailable, it is hard for the general capacitive type touch panel to detect the location of a touched point correctly.

Meanwhile, for a general resistive type touch panel, when a surface of an upper substrate having an upper electrode thereon is touched with input means, such as stylus pens or fingers, the upper electrode of the upper substrate is electrically connected to a lower electrode of a lower substrate. Thus, a voltage change is read according to a resistance value at the touched point, and then the coordinates of the touched point can be determined according to the potential change in the controller. Therefore, it is possible for the resistive type touch panel to detect the location of a touched point with a gloved hand or a non-conductive stylus pen, irrespective of whether the input device is conductive. However, unlike the capacitive type touch panel, since the resistive type touch panel detects the location of a touched point according to the resistance of the transparent conductive layer, it suffers from inaccuracy and low resolution, compared with the capacitive type touch panel.

SUMMARY OF THE INVENTION

Accordingly, the present invention is directed to a display device integrated with a touch panel that substantially obviates one or more problems due to limitations and disadvantages of the related art.

An advantage of the present invention is to provide a touch panel which can use various types of input means, irrespective of whether the input is conductive, so that, in addition to conductive means, a gloved hand or a non-conductive stylus pen can be used as an input means.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch panel may, for example, include a supporting substrate; a first transparent conductive layer having first a electrode for applying a voltage to the supporting substrate; a second transparent conductive layer having a second electrode and facing the first transparent conductive layer; an adhesive for attaching the first and second transparent conductive layers to each other; and a passivation film on an outer surface of the second transparent conductive layer.

In another aspect of the present invention, a method of fabricating a touch panel integrated with a display device may, for example, include providing a supporting substrate; forming a first transparent conductive layer having a first electrode for applying a voltage to the supporting substrate; forming a second transparent conductive layer having a second electrode and facing the first transparent conductive layer; attaching the first and second transparent conductive layers to each other using an adhesive; and forming a passivation film on an outer surface of the second transparent conductive layer.

In another aspect of the present invention, a liquid crystal display device integrated with a touch panel may, for example, include the touch panel having a supporting substrate having first and second surfaces, a first transparent conductive layer on the first surface of the supporting substrate, the first transparent conductive layer having a first electrode for applying a voltage to the supporting substrate, a second transparent conductive layer having a second electrode and facing the first transparent conductive layer, an adhesive between the first and second transparent conductive layers, and a passivation film on an outer surface of the second transparent conductive layer; and the liquid crystal display device on the second surface of the supporting substrate of the touch panel, the liquid crystal display device having a first substrate having a plurality of thin film transistors, a second substrate having a color filter and facing the first substrate, and a liquid crystal layer between the first and second substrates.

In yet another aspect of the present invention, a method for fabricating a liquid crystal display device integrated with a touch panel may, for example, include providing a supporting substrate having first and second surfaces; forming a first transparent conductive layer on the first surface of the supporting substrate, the first transparent conductive layer having a first electrode for applying a voltage to the supporting substrate; forming a second transparent conductive layer having a second electrode and facing the first transparent conductive layer; attaching the first and second transparent conductive layers to each other using an adhesive; forming a passivation film on an outer surface of the second transparent conductive layer; and forming the liquid crystal display device on the second surface of the supporting substrate of the touch panel, the method for fabricating the liquid crystal display device including preparing a first substrate having a plurality of thin film transistors, preparing a second substrate having a color filter and facing the first substrate, and providing a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Figure 5A:
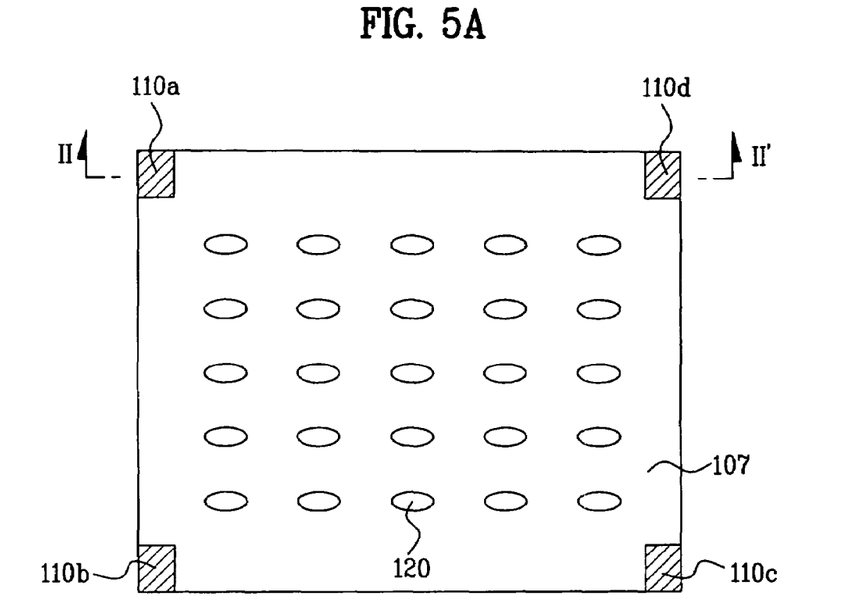
FIG. 5A and FIG. 5B are plan views illustrating lower and upper films of a touch panel according to an embodiment of the present invention.
Figure 5B:
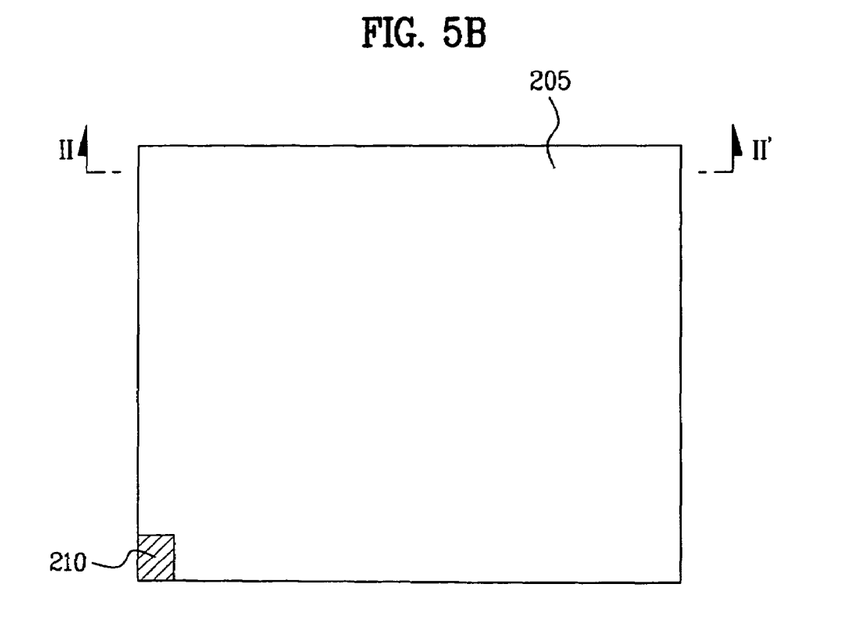
Figure 6:
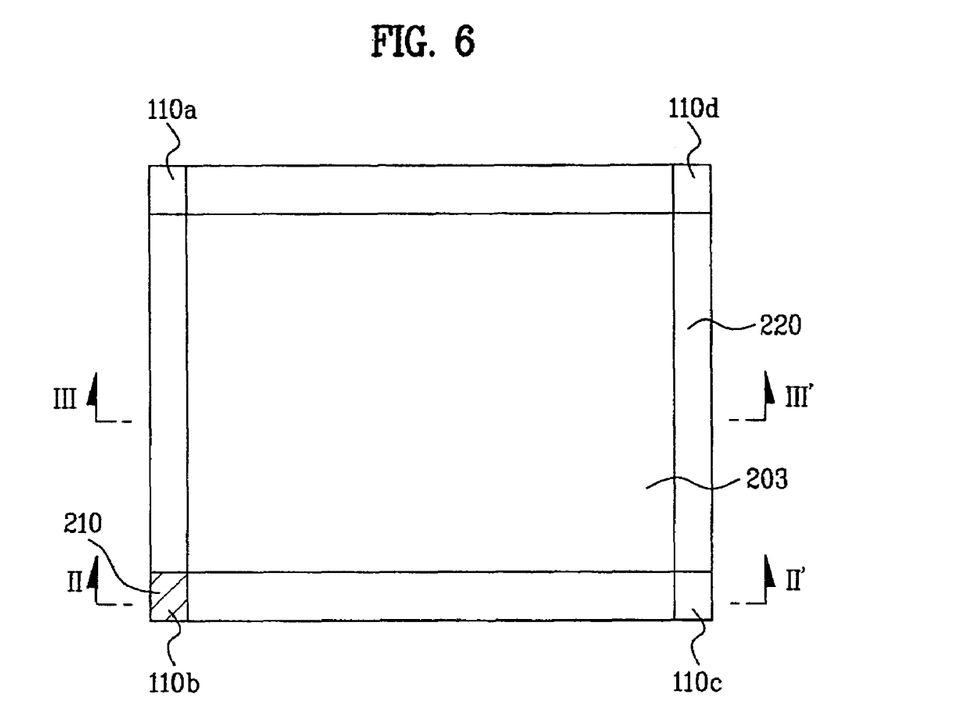
FIG. 6 is a plan view illustrating a bonding state between the lower and upper films of FIG. 5A and FIG. 5B.
Figure 7:
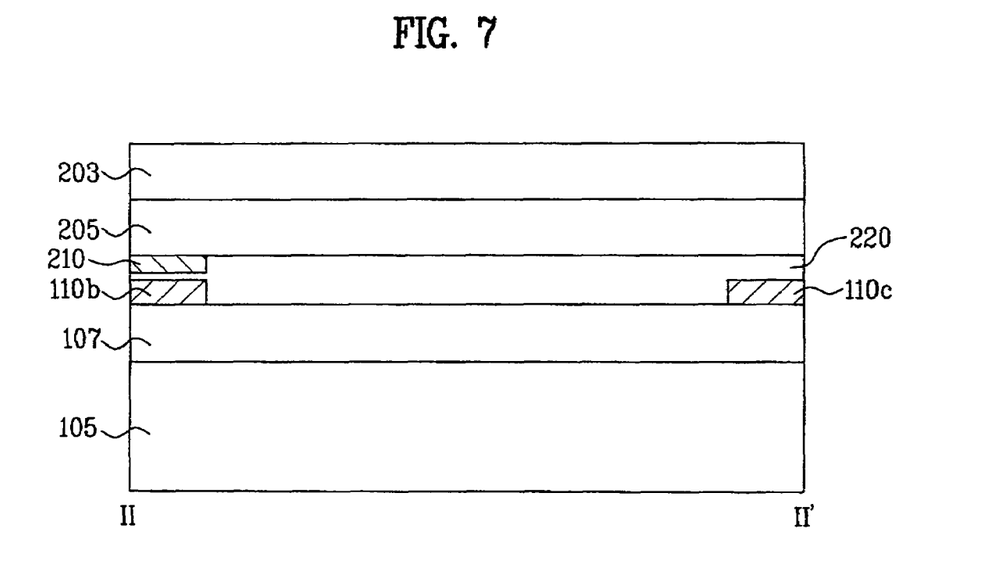
FIG. 7 is a cross-sectional view taken along line II-II' of FIG. 5A, FIG. 5B and FIG. 6.
Figure 8:
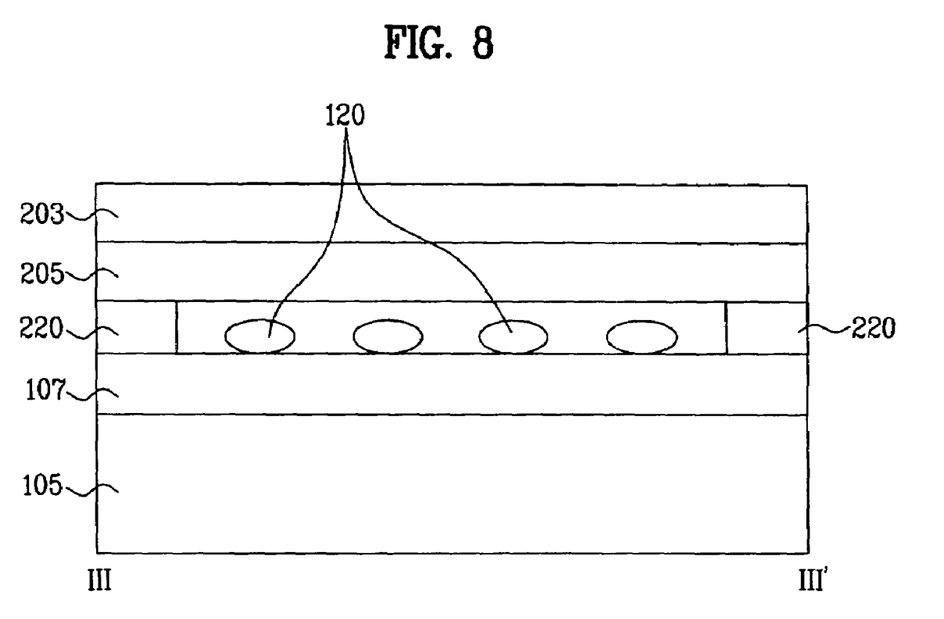
FIG. 8 is a cross-sectional view taken along line III-III' of FIG. 6.

FIG. 5A and FIG. 5B are plan views illustrating lower and upper films of a touch panel according to the present invention, respectively. FIG. 6 is a plan view illustrating a bonding state between the lower and upper films of FIG. 5A and FIG. 5B. FIG. 7 is a cross-sectional view taken along line II-II' of FIG. 5A, FIG. 5B and FIG. 6. FIG. 8 is a cross-sectional view taken along line III-III' of FIG. 6.

In the touch panel according to the present invention, a glass substrate 105 is provided as a supporting substrate. Then, as shown in FIG. 5A, after forming a first transparent conductive layer 107, metal electrodes 110a, 110b, 110c and 110d are respectively formed at four corners of the first transparent conductive layer 107. Also, a plurality of dot spacers 120 are formed at fixed intervals on the first transparent conductive layer 107, corresponding to a viewing area. Referring to FIG. 5B, a second transparent conductive layer 205 is formed, and one metal electrode 210 is formed at one side of the second transparent conductive layer 205.

As shown in FIG. 6, the first and second transparent conductive layers 107 and 205 are bonded to each other using an insulating adhesive 220, with the metal electrode 210 of the second transparent conductive layer 205 facing one of the metal electrodes 110a, 110b, 110c and 110d of the first transparent conductive layer 107 each other. At this time, the insulating adhesive 220 is formed along a circumference (dead space region) of the first and second transparent conductive layers 107 and 205. As shown in the drawings, the metal electrode 110b of the first transparent conductive layer 107 is overlapped with the metal electrode 210 of the second transparent conductive layer 205. However, the metal electrode 210 of the second transparent conductive layer 205 may be formed at the center or a predetermined portion of the dead space region to decrease a step difference of the touch panel that includes the heights of the metal electrodes 110b and 210.

Referring to FIG. 7 and FIG. 8, the metal electrodes 110a, 110b, 110c and 110d are formed in the dead space region of the touch panel, and the first and second transparent conductive layers 107 and 205 are bonded to each other in the dead space region. That is, the insulating adhesive 220 is formed covering the metal electrodes 110a, 110b, 110c and 110d so that the metal electrodes 110a, 110b, 110c, 110d and 210 are electrically insulated from one another. The first transparent conductive layer 107 is formed on the glass substrate 105, and the metal electrodes 110a, 110b, 110c and 110d are formed at the four corners of the first transparent conductive layer 107, whereby a voltage signal for forming an equipotential is applied from the external.

Even if repeated contacts or drawing processes are performed by a finger or a stylus pen on a surface of the touch panel, it is possible to prevent the first and second transparent conductive layers 107 and 205 from being broken because of the glass substrate, which serves as a supporting substrate. In addition to the glass substrate, a film type substrate may be used for the supporting substrate. Although not shown, an additional transparent conductive layer may be formed below the glass substrate 105, corresponding to the first transparent conductive layer 107, such that the additional transparent conductive layer may serve as an electrical ground. Thus, it is possible to prevent noises from a display device below the touch panel from being transmitted to the touch panel. Then, a Polyethylene Terephtalate (PET) film 203 is formed on the second transparent conductive layer 205, the PET film serving as a passivation layer. The PET film is a transparent plastic material, thereby also improving endurance and writing sensation.

As mentioned above, the metal electrode 210 is formed on the inner surface of the second transparent conductive layer 205 which faces the first transparent conductive layer 107 and is connected to an external ground voltage or a metal shielding plate, such that the metal electrode 210 grounds the second transparent conductive layer 205 when the surface of the touch panel is touched with an input means. Accordingly, when the surface of the touch panel is touched with an input means such as a finger or a stylus pen, the equipotential state of the first transparent conductive layer 107 is broken starting at the touched point, thereby generating a current. As the current flows, the amount of the charge flow is detected through current sensors connected to the metal electrodes 110a, 110b, 110c and 110d on the first transparent conductive layer 107. Subsequently, the detected analog signal is converted to a digital signal by an analog-digital converter, thereby detecting the location of the touched point. In this case, the finger or the stylus pen serves as a discharge means. Meanwhile, in case of using a gloved finger or an non-conductive stylus pen as an input means, the location of the touched point is detected according to the amount of the charge flow in the same way as in the case where a finger or stylus pen is used as an input means, and then the metal electrode 210 grounds the second transparent conductive layer 205 to discharge the charge.

As shown in FIG. 8, the dot spacers 120 are formed in the viewing area of the touch panel except in the area where the insulating adhesive 220 locates. The insulating adhesive 220 locates in the circumference of the first and second transparent conductive layers 107 and 205, which face each other, to maintain a predetermined gap between the first and second transparent conductive layers 107 and 205. Also, the PET film 203 is formed on the second transparent conductive layer 205, whereby the PET film 203 serves as a passivation layer. Unlike a capacitive type touch panel, the PET film 203 prevents conductive substances from contacting the touch panel according to the present invention. Also, the PET film 203 is a transparent plastic material, thereby improving endurance and writing sensation of the touch panel.

In the touch panel according to the present invention, a lower film is formed of the same material as that of the lower substrate in the related art capacitive type touch panel, and the transparent conductive film and the PET film are used together as an upper film. As a result, a touch panel according to the present invention has a new structure having the advantages of both capacitive and resistive type touch panels.

In case of the related art capacitive type touch panel, the inputs means are restricted to a bare hand or a conductive stylus pen. However, in case of a touch panel according to the present invention, it is possible to use a gloved hand or a non-conductive stylus pen as input means, as well as a bare hand or a conductive stylus pen. In addition, as compared with the related art capacitive type touch panel where there may be a direct contact on the transparent conductive layer for input, a touch panel according to the present invention prevents such a direct contact on the transparent conductive layer with the dot spacers, thereby improving the endurance and writing sensation.

In case of touching the surface of the display panel in the related art touch panel with a bare finger, it is possible to detect the location of the touched point using a signal change since the bare finger serves as a ground. However, if the surface of the display panel is touched with a gloved hand, the related art capacitive touch panel does not operate, since the glove is an insulator.

In a touch panel according to the present invention, it is possible to use various input means irrespective of material of the input means. That is, like a resistive type touch panel, a hand or a pen can be used as an input means for a touch panel according to the present invention. Further, a touch panel according to the present invention maintains the advantages of capacitive type touch panel, including endurance.

A display device integrated with a touch panel according to the present invention may include a LCD device as a display device. The liquid crystal display device generally includes a lower substrate having a plurality of thin film transistors, a upper substrate having a color filter and facing the lower substrate, and a liquid crystal layer between the upper and lower substrates. Then, a touch panel according to the principles of the present invention may be attached to one of the upper and lower substrates of the LCD device.

However, a display device integrated with a touch panel according to the present invention may have other display devices. In such a case, an adhesive may be formed on an entire surface or the circumference of the display device and the touch panel, such that the touch panel is attached to the display device.

As mentioned above, a display device integrated with a touch panel according to the present invention has the following advantages. In addition to conductive stylus pens, gloved hands or non-conductive stylus pens may be used as an input means for the touch panel according to the present invention. Also, a transparent plastic film is additionally formed on the upper film of a touch panel according to the present invention, thereby improving endurance.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A capacitive-type touch panel comprising:
   a supporting substrate;
   a first transparent conductive layer on an entire inner surface of the supporting substrate;
   a first electrode on the first transparent conductive layer for applying a voltage having a high frequency to the first transparent conductive layer, wherein the first electrode is metal and is formed at each of four corners of the first transparent conductive layer;
   a second transparent conductive layer facing the first transparent conductive layer;
   a second electrode on an inner surface of the second transparent conductive layer, the second electrode formed at a corner of the second transparent conductive layer and connected to an external ground voltage or a metal shielding plate;
   an adhesive between the first and second transparent conductive layers; and
   a passivation film on an outer surface of the second transparent conductive layer.

2. The touch panel of claim 1, further comprising a plurality of dot spacers formed at fixed intervals on the first transparent conductive layer.

3. The touch panel of claim 1, further comprising a transparent conductive layer formed below the supporting substrate.

4. The touch panel of claim 1, wherein the adhesive is formed along a circumference of the first and second transparent conductive layers.

5. The touch panel of claim 4, wherein the adhesive includes an insulating material.

6. The touch panel of claim 1, wherein the supporting substrate includes a glass.

7. The touch panel of claim 1, wherein the supporting substrate is a transparent film.

8. The touch panel of claim 1, wherein the passivation film is formed of a transparent plastic material.

9. The touch panel of claim 8, wherein the passivation film is a Polyethylene Terephtalate film.

10. The touch panel of claim 1, further comprising a current sensor connected to the first electrode.

11. A fabrication method of a capacitive-type touch panel comprising:
    providing a supporting substrate;
    forming a first transparent conductive layer on an entire inner surface of the supporting substrate;
    forming a first metal electrode at each of four corners of the first transparent conductive layer for applying a voltage having a high frequency to the first transparent conductive layer;
    forming a second transparent conductive layer facing the first transparent conductive layer;
    forming a second metal electrode on an inner surface of the second transparent conductive layer, the second metal electrode formed at a corner of the second transparent conductive layer and connected to an external ground voltage or a metal shielding plate;
    attaching the first and second transparent conductive layers to each other using an adhesive; and
    forming a passivation film on an outer surface of the second transparent conductive layer.

12. The method of claim 11, further comprising, forming a plurality of dot spacers at fixed intervals on the first transparent conductive layer.

13. The method of claim 11, further comprising, forming a transparent conductive layer below the supporting substrate.

14. The method of claim 11, wherein the adhesive is formed along a circumference of the first and second transparent conductive layers.

15. The method of claim 11, wherein the supporting substrate is a glass or a film.

16. The method of claim 11, wherein the passivation film is a Polyethylene Terephtalate film.

17. The method of claim 11, further comprising a current sensor connected to the first electrode.

18. A liquid crystal display device integrated with a capacitive-type touch panel comprising:
    the capacitive-type touch panel comprising:
        a supporting substrate having first and second surfaces,
        a first transparent conductive layer on the entire first surface of the supporting substrate, the first transparent conductive layer having a first electrode for applying a voltage to the first transparent conductive layer, wherein the first electrode is metal and is formed at each of four corners of the first transparent conductive layer,
        a second transparent conductive layer facing the first transparent conductive layer,
        a second electrode on an inner surface of the second transparent conductive layer, the second electrode formed at a corner of the second transparent conductive layer and connected to an external ground voltage or a metal shielding plate,
        an adhesive between the first and second transparent conductive layers, and a passivation film on an outer surface of the second transparent conductive layer; and the liquid crystal display device on the second surface of the supporting substrate of the touch panel, the liquid crystal display device comprising:
- a first substrate having a plurality of thin film transistors,
- a second substrate having a color filter and facing the first substrate, and
- a liquid crystal layer between the first and second substrates.

19. The device of claim 18, further comprising a plurality of dot spacers formed at fixed intervals on the first transparent conductive layer.

20. The device of claim 18, wherein the adhesive is formed along a circumference of the first and second transparent conductive layers.

21. The device of claim 20, wherein the adhesive includes an insulating material.

22. The device of claim 18, wherein the supporting substrate includes a glass.

23. The device of claim 18, wherein the passivation film is formed of a transparent plastic material.

24. The device of claim 23, wherein the passivation film is a Polyethylene Terephtalate film.

25. The device of claim 18, further comprising a current sensor connected to the first electrode.

26. A method for fabricating a liquid crystal display device integrated with a capacitive-type touch panel comprising:

providing a supporting substrate having first and second surfaces;

forming a first transparent conductive layer on the entire first surface of the supporting substrate, the first transparent conductive layer having a first electrode for applying a voltage having a high frequency to the first transparent conductive layer, wherein the first electrode is metal at each of four corners of the first transparent conductive layer;

forming a second transparent conductive layer facing the first transparent conductive layer;

forming a second electrode on an inner surface of the second transparent conductive layer, the second electrode formed at a corner of the second transparent conductive layer and connected to an external ground voltage or a metal shielding plate;

attaching the first and second transparent conductive layers to each other using an adhesive;

forming a passivation film on an outer surface of the second transparent conductive layer; and forming the liquid crystal display device on the second surface of the supporting substrate of the touch panel, the method for fabricating the liquid crystal display device comprising:

preparing a first substrate having a plurality of thin film transistors, preparing a second substrate having a color filter and facing the first substrate, and providing a liquid crystal layer between the first and second substrates.

27. The method of claim 26, further comprising, forming a plurality of dot spacers at fixed intervals on the first transparent conductive layer.

28. The method of claim 26, further comprising, forming a transparent conductive layer below the supporting substrate.

29. The method of claim 26, wherein the adhesive is formed along a circumference of the first and second transparent conductive layers.

30. The method of claim 26, wherein supporting substrate is a glass or a film.

31. The method of claim 26, wherein the passivation film is a Polyethylene Terephtalate film.

32. The method of claim 26, further comprising a current sensor connected to the first electrode.

* * * * *